Figure 1:
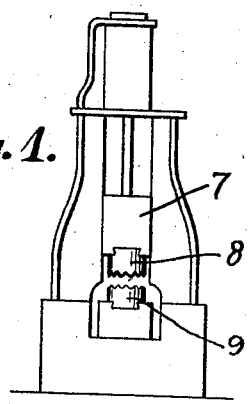

Jan. 11, 1927.

W. T. WOODS 1,614,332

PROCESS OF FORMING DISK CUTTERS

Filed July 12, 1926

Inventor
Walter T. Woods
By Lyon & Lyon
Attorneys

Patented Jan. 11, 1927.

1,614,332

UNITED STATES PATENT OFFICE.

WALTER T. WOODS, OF LONG BEACH, CALIFORNIA, ASSIGNOR TO U. S. TOOL COMPANY, OF LOS ANGELES, CALIFORNIA, A CORPORATION OF CALIFORNIA.

PROCESS OF FORMING DISK CUTTERS.

Application filed July 12, 1926. Serial No. 121,803.

This invention relates to a process of manufacturing disk cutters, and refers particularly to a process for manufacturing disk cutters of the type employed upon rotary drilling bits for use in the drilling of deep wells.

An object of the present invention is to provide a process for economically manufacturing a disk cutter of an improved form. The process of the present invention produces a forged disk cutter provided with a continuous corrugated cutting edge. The cutter provided by the process of the present invention thus may possess substantially 25 per cent greater cutting edge for the same diameter than a cutter with a plain circular cutting edge. Moreover, the cutter produced by the present invention is found to more rapidly drill in a well hole and also more adequately insures the rotation of the cutters on their mountings. It is found highly desirable to produce a disk cutter having a corrugated edge in which only the outer portion of the disk cutter is corrugated and in which the thickness of the cutters is substantially increased at the inner ends of the corrugations. A disk cutter of this character will operate to continue drilling until worn to the ends of the corrugations and then, due to the substantial increase in thickness of the cutters, the bit will substantially cease cutting and also wearing.

More specifically, an object of the present invention is to provide a method for facilitating the production by a drop-forging process of a disk cutter having a corrugated portion and a thickened central portion with a rapid increase in thickness between the corrugated portion and the central portion of the cutter.

Various further objects and advantages of the present invention will be apparent from a description of a preferred example of a process of producing the cutters embodying the present invention. For this purpose, reference is made to the accompanying drawings, in which are illustrated means for carrying out the preferred method.

Figures 4, 5:
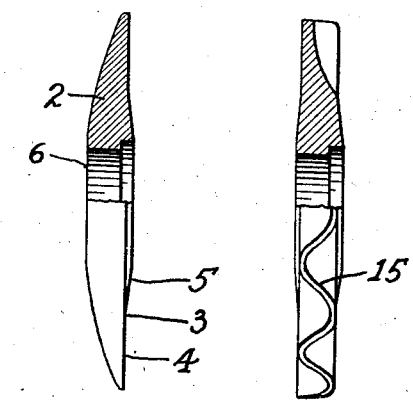
Figure 2:
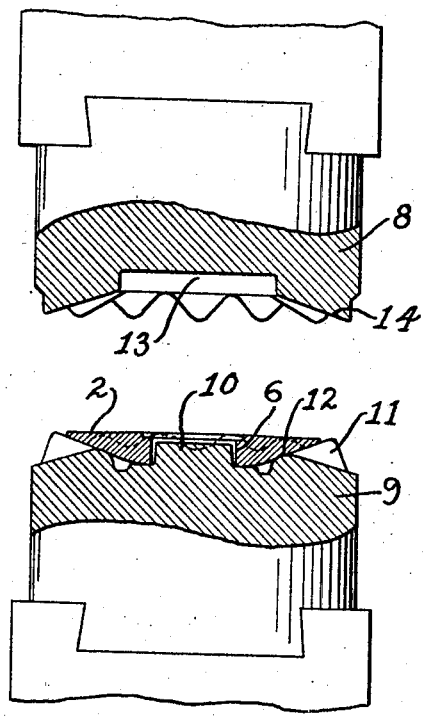
Figure 3:
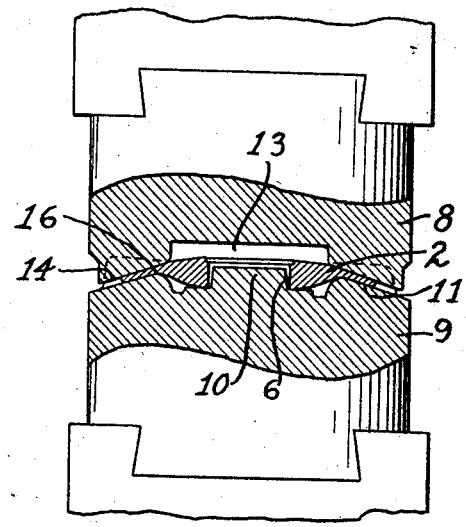

In the drawings:

Figure 1 is a diagrammatic elevation of a steam hammer and dies employed in the corrugating process, Figure 2 is an enlarged elevation, partly in section, of the corrugating dies with a blank positioned therein, Figure 3 is a similar view with the dies moved together to perform the corrugating operation, Figure 4 is a side elevation of the blank formed previous to the corrugating operations, and Figure 5 is a side elevation of the completed disk cutter.

Referring first to Figure 4 of the drawings, there is first formed in a proper manner a blank 2 of the general shape and diameter of the desired cutter. The blank 2 may be formed in any desired manner but it is preferably drop-forged into the shape indicated in Figure 4. An important feature of the process is the formation of a blank in which, as indicated at 3, there is at least a slight jog in one of the faces of the blank such, for example, as exists where one of the side faces of the blank 2 is straight throughout the outer portion of the cutter, as indicated at 4, and therefrom the cutter is enlarged in the form of a truncated cone, as indicated at 5, and provided with an enlarged hub for the blank. The blank 2 is further provided with an opening 6 therethrough of generally the shape of opening desired in the finished cutter.

The blank 2 thus described is then heated to a proper temperature and corrugated by means of the steam hammer 7 having the dies 8 and 9. The die 9 is the lower stationary die and is indicated as having a central core 10 for fitting within the opening 6 of the blank 2 and supporting the blank in place. The die 9 has its outer portion corrugated as indicated at 11, and at the inner end of the corrugated portion, as indicated at 12, there is a rapid downward bend in the die 9 to provide an abrupt bending point over which the outer straight portion 4 of the blank 2 may be bent in the corrugating portion. The rapid bend 12 on the die 9 corresponds in position substantially with the jog 3 of the blank 2 when the blank 2 is placed or supported on this die. The die 9 is relieved downwardly so that the force of the corrugating operation may be exerted solely on the outer portion 4 of the blank 2.

The upper or traveling die 8 has its central portion 13 recessed so that this portion of the die does not engage the blank 2 during the corrugating operation. The outer portion 14 of said die only is corrugated, the corrugations being shaped to coact with the corrugations 11 of the lower die 9 and for bending the outer portion 4 of the blank 2 down over the rapid bend 12 in the lower die 9 to produce an evenly corrugated cutting edge on the finished cutter.

The finished cutter is indicated in Figure 5 as provided with the continuous cutting edge 15. The corrugations extend inwardly toward the axis of the cutter for a distance equal only to about one-third of the radius of the cutter and at the end of the corrugations, as indicated at 16, there is a substantial increase in the thickness of the cutter.

While the process of producing disk cutters herein described is well adapted to carry out all the objects, purposes and advantages of the present invention, various modifications may be made without departing from the invention, and the invention includes all such modifications and changes as come within the scope of the appended claims.

I claim:

1. A method of forming drilling cutters comprising first forming a blank of varied cross section and of the general shape of the desired cutter, the blank having a jog therein at a point where the cross section varies, heating the blank and placing the same between dies having corrugated portions extending substantially to the jog on the blank, and actuating the dies so as to corrugate the outer portion only of the blank.

2. The method of forming drilling cutters which comprises first forming a blank of varied cross section and of the general shape of the desired cutter, the blank having a jog therein and the outer portion of the blank being of slightly reduced thickness from the jog to the perimeter, heating the blank and placing the same between dies having corrugating portions extending substantially to the jog on the blank, and actuating the dies to corrugate the outer portion only of the blank.

3. A method of forming drilling cutters comprising first forming a blank of varied cross section and of the general shape of the desired cutter, heating the blank and placing the same between dies having annular corrugating portions adapted for engagement only with the outer portion of the blank, the blank having a jog and being of reduced thickness from the jog to the perimeter, and actuating the dies to corrugate the outer portion thereof.

4. A process of forming drilling cutters which comprises first forming a blank with a central opening and with a jog in one face and of reduced thickness from the jog to the perimeter, heating the blank and placing the same between coacting dies having annular corrugated portions extending substantially to the jog on the blank, one of the dies having an abrupt bend at said point, and one of the dies having a core interfitting with the opening in said blank, and actuating the dies to corrugate the outer portion only of the blank.

Signed at Los Angeles, California, this 29th day of June 1926.

WALTER T. WOODS.